Patented June 19, 1928.

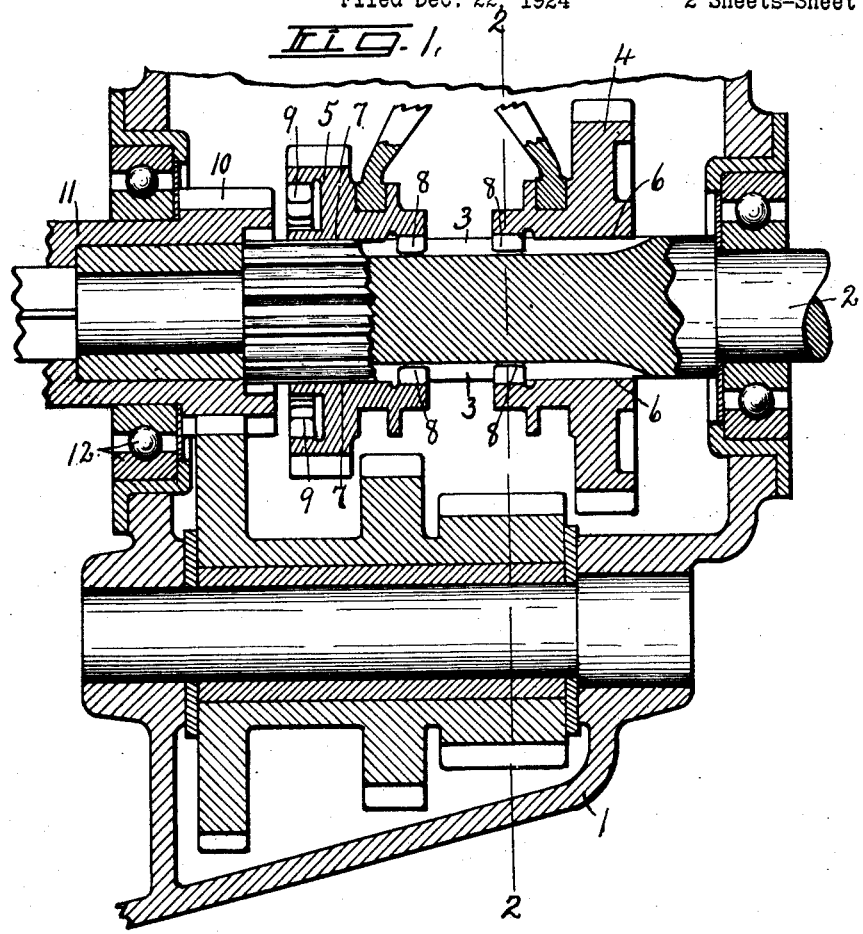

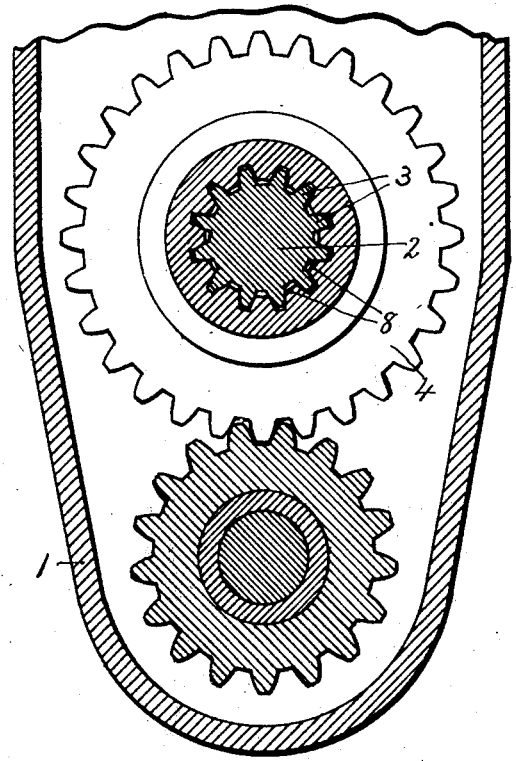
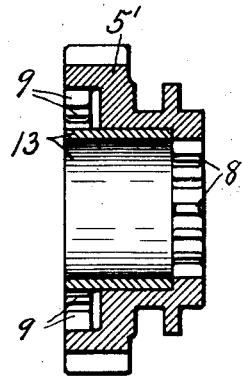
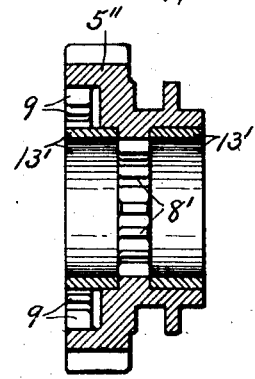

1,674,093

UNITED STATES PATENT OFFICE.

JULIAN S. BROWN, OF SYRACUSE, NEW YORK.

SLIDING-GEAR POWER-TRANSMISSION MECHANISM.

Application filed December 22, 1924. Serial No. 757,434.

This invention relates to sliding gears as used more particularly in variable speed power transmission for motor vehicles. Under the present practice, most commonly employed, the speed-changing gears are splined upon a suitable motor driven shaft for axial sliding movement, the splines or keys of each part being preferably arranged in uniformly spaced relation circumferentially to ride in correspondingly arranged grooves or keyways in the other part.

The splines and grooves of the gear usually extend the entire axial length of the hub of the gear while the splines and grooves of the shaft upon which the gear is slidably mounted extends some distance beyond the ends of the splines and grooves of the gear to permit relative sliding movement of one part upon the other part so that when the parts are assembled for use the gear is supported entirely by the driving surfaces and in view of the fact that the depths of the grooves and splines in the finished gear and shaft may vary materially it is evident that the result would be a corresponding variation in axial alignment of and lost motion between the gear and shaft.

It is well known that these splines and grooves are usually cut in the gears and shaft while they are still in a more or less machinable condition but owing to the necessity for hardening those elements for use in the transmission train it is found that the splines and grooves become more or less distorted which necessitates the regrinding of those parts to enable them to be properly assembled in the transmission unit.

It is, of course, possible to grind the circumferential surfaces of the splines or ribs of the shaft and also to grind the inner surfaces of the splines of the gear with a reasonable degree of accuracy but thus far it has not been possible to grind the grooves of either of those parts with a sufficient degree of accuracy to avoid decentering and excessive lost motion when assembled one upon the other for use without resorting to methods which would be prohibitive in this art from an economic standpoint.

The main object, therefore, of my present invention is to construct the sliding gear and its supporting shaft in such manner that the centering and supporting surfaces of the gear and shaft are entirely independent of the driving surfaces by making the supporting surfaces of the gear in the form of an unbroken circular bore which together with the peripheral surfaces of the shaft may be easily and quickly ground to the required substantially equal diameters for accurately centering and supporting the gear upon the shaft in all positions of sliding adjustment while the driving surfaces may be left substantially as hardened or without grinding, it being understood that due allowance is made for distortion of the splines of the gear in hardening without interfering with the free engagement thereof in the grooves of the shaft when the parts are assembled for use.

In other words, I have sought to produce a sliding gear transmission in which the centering and supporting surfaces are exactly concentric to a common axis and at the same time to provide those parts with driving connections in the form of serrations or corrugations adapted to readily interlock with each other without special fitting or grinding other than a reasonably accurate machining before hardening.

Other objects and uses relating to specific parts of the device will be brought out in the following description.

In the drawings:—

Figure 1 is a longitudinal vertical sectional view of a portion of a sliding gear transmission mechanism for motor vehicles.

Figure 2 is a transverse, vertical sectional view taken in the plane of line 2—2, Figure 1.

Figures 3 and 4 are sectional views of slightly modified forms of sliding gears.

In order that my invention may be clearly understood I have shown a portion of a gear case —1— of a variable speed power transmitting mechanism of the sliding gear type and comprising an engine shaft —2— and a countershaft both journaled in suitable bearings in the gear case —1— to revolve about parallel axes in spaced relation.

The portion of the engine shaft —2— within the gear case —1— is provided with circumferentially corrugated periphery, forming splines or keys —3— preferably in uniformly spaced relation, and intervening grooves which may be cut to the desired form in the stock before hardening thus permitting the peripheral edges of the splines or keys —3— to be ground to the desired radius and concentricity after hardening in case the splines should become distorted radially thereby forming concentric peripheral bearing surfaces of equal radii upon which the sliding gears as —4— and —5— may be mounted.

These sliding gears are provided throughout the major portion of their lengths with central cylindrical bores —6— and —7— which, even though deformed in hardening, may be accurately ground to the required diameter to fit closely upon the previously ground peripheries of the splines of the shaft for supporting the gears exactly concentric or co-axial with the shaft independently of the driving connections between the gears and shaft.

These driving connections consist in this instance of the serrations (ribs and grooves) on the shaft and similar relatively short serrations —8— on the interior of the gears. The splines —8— of the gears project inwardly beyond the walls of the respective bores —6— and —7— so as to engage in the peripheral grooves of the shaft —2— and while the number of teeth or splines —8— are shown as corresponding to those of the shaft it is evident that they may be less in number and that when properly formed before hardening to readily enter the grooves of the shaft they retain closely their original form against distortion by hardening by reason of their relatively short lengths thus permitting them to readily enter the grooves of the shaft after hardening to establish driving connections between the shaft and gears independently of the means for holding the gears and shaft in exact co-axial relation.

In other words, the splines of the shaft and gears may be cut in the original stock before hardening in such manner as to leave ample clearance for entrance of the teeth of one part into the grooves of the other, even though they may be slightly distorted after hardening without in any way affecting the exact co-axial relation of the shaft and gears.

The gear —5— is also provided with additional inner circumferential series of teeth or splines —9— adapted to slidably interlock with similar serrations or teeth —10— of a driving shaft —11— which is journaled in suitable bearings —12— on the frame —1— co-axial with the shaft —2—, and serves as a bearing for the adjacent end of said shaft.

These teeth —7— and —10— are cut in the original stock in such manner as to leave ample clearance for interlocking engagement after hardening without in any way affecting the co-axial relation after hardening to afford the necessary driving connections between the shaft —11— and gear —5—, independently of the means for supporting those parts in co-axial relation.

As shown in Figure 1 the bearing portion of the gear —5— extends axially within the serrated portion —9— and is formed integral with said gear but if it is desired to facilitate the cutting of the splines —9— the gear as —5'— may be provided with an inner cylindrical sleeve as —13— shouldered against the inner ends of the flange having the splines —8— to extend within the splines —9— as shown in Figure 3 so that when the sleeve is removed the teeth or splines —9— may be readily cut to the desired form by the usual tools provided for that purpose after which the sleeve may be placed in operative position to form the necessary bearing upon the splined shaft for centering the gear upon the shaft and holding it in co-axial relation thereto independently of the driving connections.

In Figure 4 is shown a gear —5''— somewhat similar to the gear —5— except that the interlocking splines as —8'— are formed integral therewith some distance from both ends thereof to form part of the driving connections between the gear and shaft while the centering and supporting bearings are formed by opposite sleeves —13'— and —13'— extending from opposite ends of the splines —8'— to the corresponding ends of the hub of the gear for supporting the gear upon the shaft co-axial therewith independently of the driving connection.

While the mechanism thus far described is particularly applicable to variable speed transmitting power mechanisms of the slidable gear type for automobiles, it is evident that it may be used in sliding gear mechanism for other purposes, and therefore, I do not wish to limit the invention to motor vehicle transmission gearing.

What I claim is:—

1. The combination with a spline shaft having the outer peripheral surfaces of its splines ground true with respect to the axis of the shaft, of a gear having an internal cylindrical bearing surface the greater portion of its length bearing directly upon the peripheral surfaces of the splines, said gear having relatively short teeth projecting between the splines of the shaft in continuously driving engagement therewith.

2. The combination with a spline shaft having the outer peripheral surfaces of its splines ground true with respect to the axis of the shaft, of a gear having internal clutch teeth and internal spline-engaging teeth in axially offset relation to the clutch teeth, said gear having an internal cylindrical bearing surface of greater axial length than the spline engaging teeth and bearing directly upon the peripheral surfaces of the splines, said spline engaging teeth being in continuous drivng engagement with the spline shaft.

In witness whereof I have hereunto set my hand this 11th day of December, 1924.

JULIAN S. BROWN.